(12) United States Patent
Gundling

(10) Patent No.: US 10,363,670 B1
(45) Date of Patent: Jul. 30, 2019

(54) DEVICES, SYSTEMS, AND METHODS FOR DYNAMIC BENDING OF INFLATABLE STRUCTURES

(71) Applicant: Ryan Gundling, Staunton, VA (US)

(72) Inventor: Ryan Gundling, Staunton, VA (US)

( * ) Notice: Subject to any disclaimer, the term of this patent is extended or adjusted under 35 U.S.C. 154(b) by 75 days.

(21) Appl. No.: 15/343,403

(22) Filed: Nov. 4, 2016

Related U.S. Application Data

(60) Provisional application No. 62/250,851, filed on Nov. 4, 2015.

(51) Int. Cl.
*B25J 18/06* (2006.01)
*F15B 15/10* (2006.01)
*B25J 9/10* (2006.01)
*B25J 9/14* (2006.01)

(52) U.S. Cl.
CPC ............ *B25J 18/06* (2013.01); *B25J 9/1075* (2013.01); *B25J 9/144* (2013.01); *F15B 15/103* (2013.01)

(58) Field of Classification Search
CPC ........ B25J 9/1075; B25J 9/142; B25J 18/002; B25J 28/06
See application file for complete search history.

(56) References Cited

U.S. PATENT DOCUMENTS

| | | | |
|---|---|---|---|
| 3,601,442 A * | 8/1971 | Orndorff | B25J 15/0023 294/119.3 |
| 4,551,061 A | 11/1985 | Olenick | |
| 4,794,912 A * | 1/1989 | Lia | A61B 1/0053 600/152 |
| 4,900,218 A | 2/1990 | Sutherland | |
| 5,065,640 A | 11/1991 | Koren | |
| 5,080,000 A | 1/1992 | Bubic | |
| 5,083,498 A * | 1/1992 | Sato | F15B 15/125 73/731 |
| 5,178,129 A * | 1/1993 | Chikama | A61B 1/0051 138/120 |
| 5,203,319 A * | 4/1993 | Danna | A61B 1/0053 600/152 |
| 5,377,950 A * | 1/1995 | Salcudean | B25J 3/04 248/550 |
| 5,421,128 A | 6/1995 | Sharpless | |
| 5,677,023 A | 10/1997 | Brown | |
| 5,735,083 A | 4/1998 | Brown | |
| 5,937,732 A * | 8/1999 | Homann | F15B 15/103 92/43 |
| 8,544,212 B2 | 10/2013 | Brown | |
| 8,984,814 B2 | 3/2015 | Brensinger | |
| 9,492,930 B2 * | 11/2016 | Galloway | B25J 15/0023 |
| 9,777,753 B2 * | 10/2017 | Niiyama | F15B 15/103 |
| 2002/0108491 A1 * | 8/2002 | Stahn | F01B 19/04 92/92 |
| 2007/0251185 A1 | 11/2007 | Haggard | |

(Continued)

*Primary Examiner* — F Daniel Lopez
*Assistant Examiner* — Matthew Wiblin
(74) *Attorney, Agent, or Firm* — Michael Haynes PLC; Michael N. Haynes

(57) ABSTRACT

Certain exemplary embodiments can provide a system, machine, device, and/or manufacture configured for and/or resulting from, and/or a method for, activities that can comprise and/or relate to, an air beam configured to be dynamically moved, the air beam having an inflatable gas bladder, a first tube substantially surrounding the gas bladder, and one or more axial reinforcements.

14 Claims, 12 Drawing Sheets

(56) References Cited

U.S. PATENT DOCUMENTS

| | | | |
|---|---|---|---|
| 2008/0302200 A1* | 12/2008 | Tobey | B25J 5/007 74/490.02 |
| 2012/0159866 A1 | 6/2012 | Brown | |
| 2013/0091974 A1 | 4/2013 | Riwan | |
| 2013/0152724 A1 | 6/2013 | Mozeika | |
| 2015/0141756 A1* | 5/2015 | Cheng | A61B 1/00078 600/146 |

* cited by examiner

DEVICES, SYSTEMS, AND METHODS FOR DYNAMIC BENDING OF INFLATABLE STRUCTURES

CROSS-REFERENCES TO RELATED APPLICATIONS

This application claims priority to, and incorporates by reference herein in its entirety, U.S. Provisional Patent Application 62/250,851, filed 4 Nov. 2015.

BRIEF DESCRIPTION OF THE DRAWINGS

A wide variety of potential, feasible, and/or useful embodiments will be more readily understood through the herein-provided, non-limiting, non-exhaustive description of certain exemplary embodiments, with reference to the accompanying exemplary drawings in which.

DESCRIPTION

Figure 1:
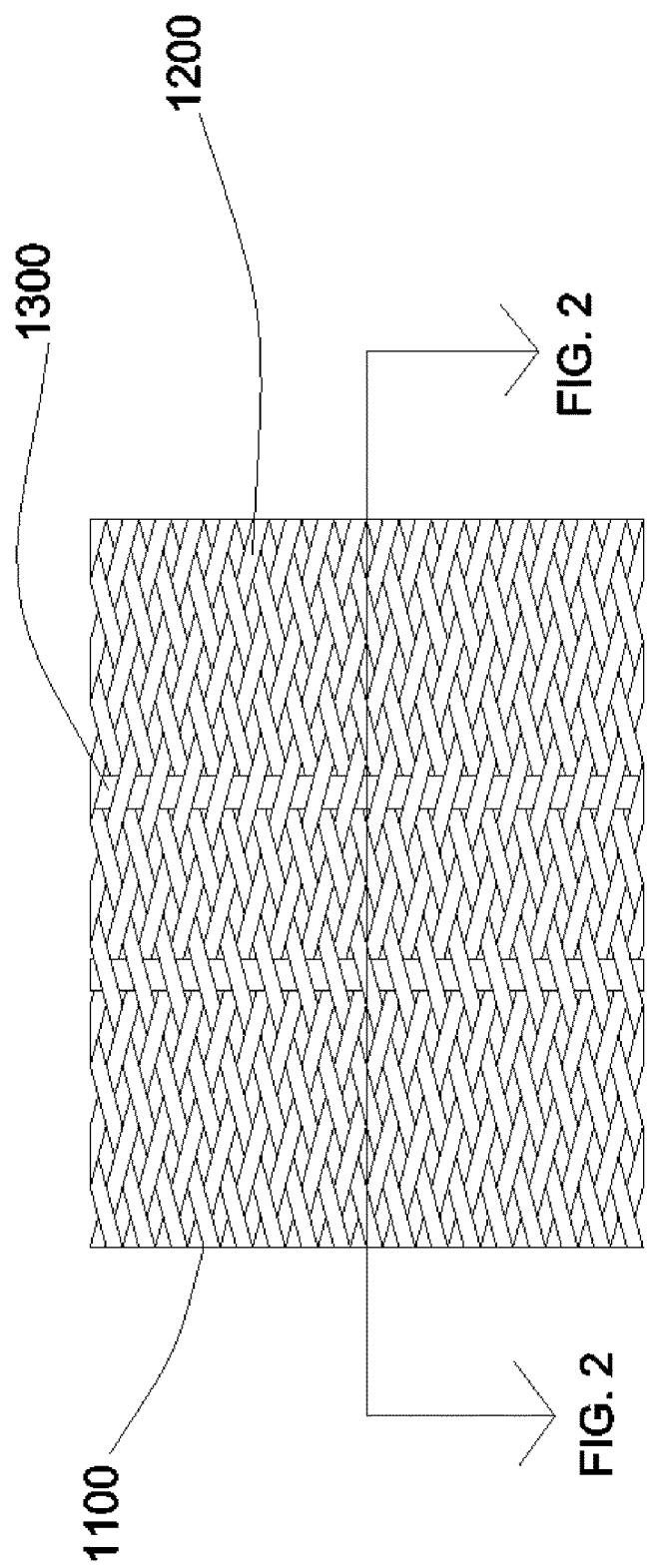
FIG. 1 shows a side view of an exemplary unrestrained portion of a seamless braided tube of an exemplary air beam.

Certain exemplary embodiments can be utilized in the field of soft robotics and/or with developing inflatable articulating structures that can provide significant benefits in the area of transportability, cost, weight, and/or human interaction. Certain exemplary embodiments can use an inflatable structure, which can be formed from one or more seamless and/or braided tubes with axial reinforcements, in which tubes the braided architecture can be arranged substantially in the circumferential and/or longitudinal ("axial") direction to optimize the strength of the inflatable structure. This optimization can be accomplished through a braid design that utilizes the braid angle, machine size, tube diameter, amount of yarn, and/or denier of the yarn to configure the strength of the beam, allowable working pressure, beam size, and/or range of motion. The assembled beam can include axial reinforcement that can be added during the braiding process and/or adhered inside and/or on the surface of the braid body after the braiding process. The position, denier, and/or modulus of elasticity of these axial reinforcements can further optimize performance of the finished beam through influencing its dynamic characteristics, strength, and/or stiffness. This can result in embodiments that can handle higher pressures, larger range of sizes, and/or more degrees of freedom.

Certain exemplary embodiments can provide an inflatable structure that utilizes a pressure vessel or tube combined with one or more variable-length axial reinforcements to provide dynamic bending of the inflatable structure without the need for pinching down the tube, resulting in a wide range of available movements for the inflatable structure.

Certain exemplary embodiments can couple one or more inflatable custom and/or braided tubes to one or more reinforcements ("axial reinforcements") that extend substantially parallel to the longitudinal axis of one or more of the tubes (and/or sections of one or more continuous tubes) to create an inflatable and/or operably inflated structure (an "air beam") that can be configured to have a wide variety of movement types. The air beam, which can be inflated with any gas (including air, nitrogen, oxygen, and/or helium, of any purity and/or comprising other constituent solutes, gases, liquids, and/or solids), can have a high bending strength due to the ability to operate at higher pressures (a maximum practical pressure might be 125 psi due to commercial compressor limits, but for specialized application the braid body could be designed to handle over 300 psi) and/or the stiffness and/or strength can be tailored by locating axial reinforcements in specific locations around the circumference of the air beam. An enhanced range of motion, such as the ability to bend up 360 degrees around an axis oriented substantially perpendicular to the longitudinal axis of the air beam can derive from the tube(s) being capable of changing angle, such as from approximately 0 degrees to approximately 90 degrees, as measured with respect to the longitudinal axis of the tube, depending on the nature or balance of the forces applied to the tube(s) substantially parallel to that tube's axial (longitudinal) direction. The same air beam (and/or tube(s)) can approach zero stiffness in one plane that extends substantially parallel to its longitudinal axis and in another can be incredibly stiff. The air beam and/or tube(s) can be configured to have a hinge-like action at a specific location and/or down the entire length of the beam and/or tube(s), which can create movement similar to that of a snake. This movement can be accomplished by the angle that is formed in a tube being substantially free to change with respect to the tube's longitudinal axis at nearly any point along the length of the tube (or a predetermined section of the tube). The inflated tube's angle change can create a length change on each side of the tube, which can create a bend in the inflated tube.

This movement of an air beam (and/or a component tube(s) of that air beam) need not be limited to a single plane or a single point down the length of the air beam and/or tube(s). Movement also can be restrained in a certain plane with fixed length axial reinforcements and/or the air beam and/or tubes can be free to move in all planes by having adjustable axial reinforcements that are distributed around the circumference of one or more tubes (and/or one or more sections of one or more tubes) of the air beam.

FIG. 1 illustrates an exemplary embodiment of a seamless braided tube 1100 of an air beam. FIG. 1 also shows the potentially intricate nature of exemplary yarns of an unrestrained portion of an exemplary tube. To improve clarity, the yarns will not be shown in the remaining figures. In this embodiment, the bias yarn 1200 are at a 75-degree angle off the longitudinal centerline. The axial elements 1300 are braided into the braided tube at the desired positions. In other embodiments, the braided tube 1100 can be constructed without axial elements. When utilized, axial elements can be bonded during the final assembly of the dynamic structure as described in later paragraphs. For clarity, the braid yarn detail will not be shown in the remaining drawings.

Figure 2:
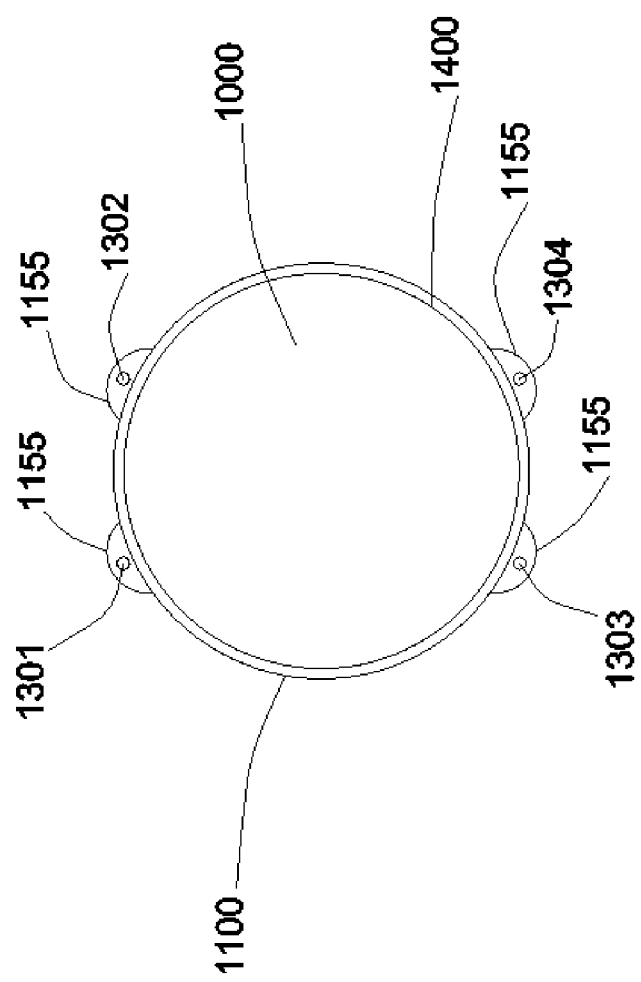
FIG. 2 shows a cross-sectional view taken at section 2-2 of FIG. 1.

As shown in FIG. 2, an air beam 1000 can be constructed using a gas barrier (or bladder) 1400, which can be formed from a thermoplastic such as urethane (which can be the Argothane brand from Argotec in Greenfield, Mass., silicon, polypropylene, and/or vinyl, etc. Air beam 1000 can utilize a braided tube (or sleeve) 1100 (which can be obtained from A&P Technology of Cincinnati, Ohio), and/or one or more axial reinforcements 1300 located at various positions 1155. In certain exemplary embodiments, axial reinforcements 1300 can be and/or comprise one or more webbings, which can be supplied by Bally Ribbon Company of Bally, Pa., and/or cords, an example of which is Amsteel-Blue Series from Samson of Ferndale, Wash., and/or tows of fiber, such as those supplied by A&P Technology of Cincinnati, Ohio Gas barrier 1400 can be non-adhered and/or adhered and/or integral, through a coating or heating process, to the tube 1100, and/or can elongate, such as from approximately 150% to approximately 800% when loaded to it braking strength, to accommodate the length change in braid tube 1100. Gas barrier 1400 need not have a structural function other than containing gas that is pressurized, such as from approximately 0.5 psig to approximately 300 psig. Braided tube 1100 can provide resistance primarily to the hoop forces and/or axial forces generated by the internal pressure in gas barrier 1400. Braided tube 1100 can provide shear, tension, compression, and/or torsional strength to air beam 1000. Axial reinforcements 1300, which can be cords braided into the body of tube 1100, can control the strength, stiffness, and/or shape of air beam 1000, such as to keep the braid angle between approximately 55 and approximately 85 degrees, as measured from the longitudinal axis of the tube.

Figure 3:
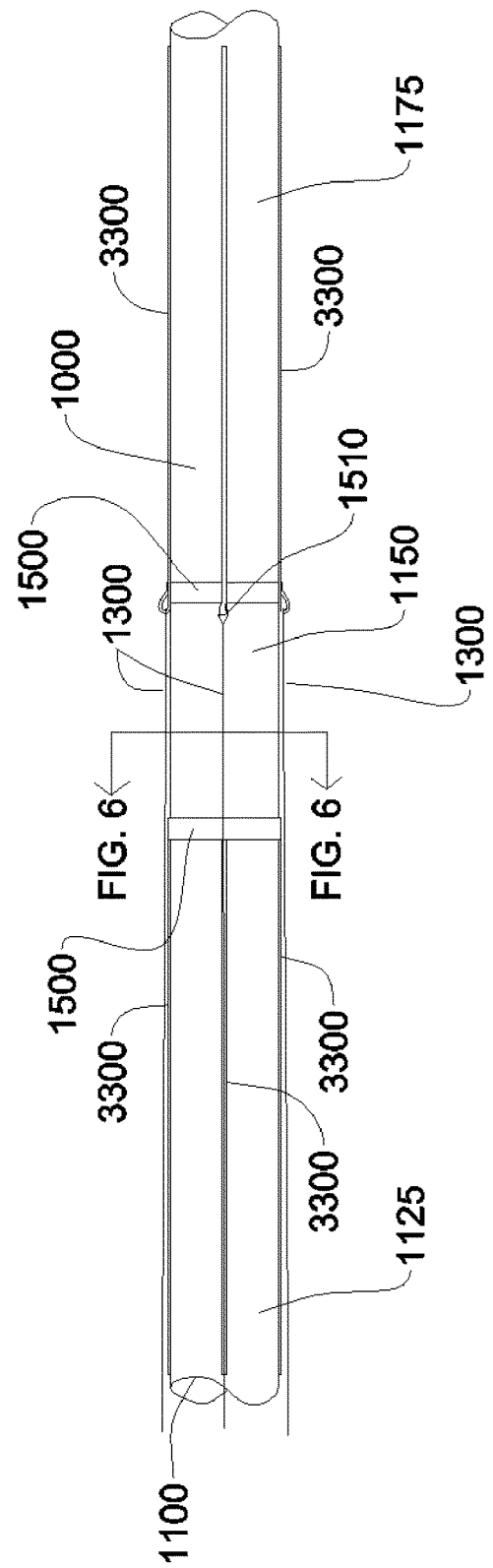
FIG. 3 shows a side view of an exemplary air beam
Figure 8:
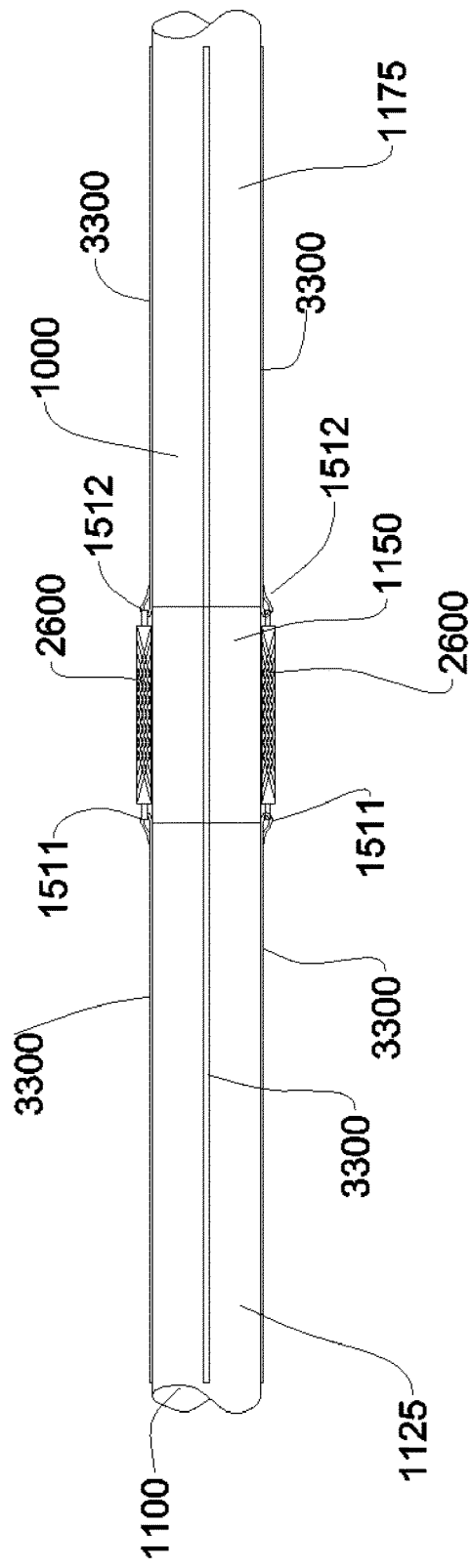
FIG. 8 shows a side view of an exemplary air beam.

As shown in the exemplary embodiment of FIG. 3, air beam 1000 and/or braided tube 1100 can be comprised of one or more fixed sections 1125, 1175 coupled to one or more "variable length" or "free braid" sections 1150, which can range in length from approximately 0.5 inches to the entire length of tube 1100. Free braid section 1150 can be free to change angle, resulting in a change in length (as shown in FIG. 8) of free braid section 1150 and/or formation of a bend in that section 1150, while leaving unbent fixed portions 1125, 1175 of tube 1100. Such a change in angle can be due to the influence of forces applied via adjustable cords that span free braid section 1150 and extend beyond to one or more actuators, such as pneumatic muscles (not shown) in adjacent portions of air beam 1000.

Figure 4:
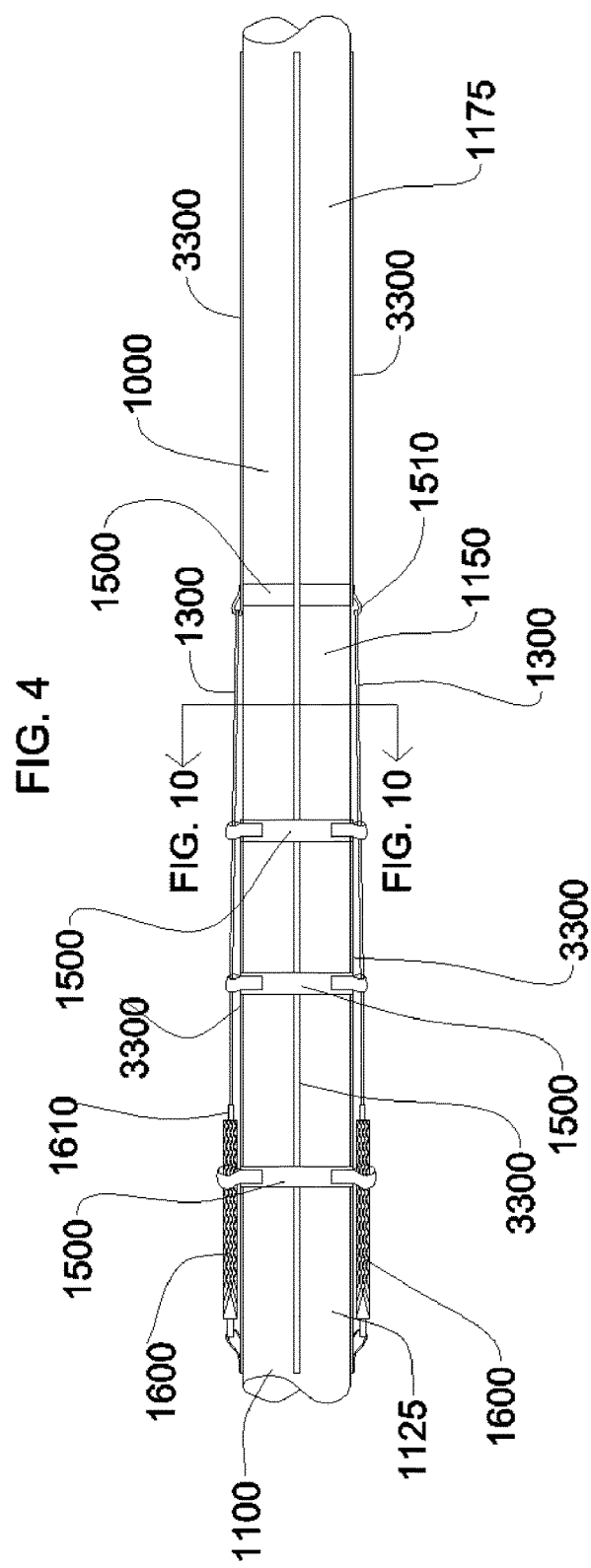
FIG. 4 shows a side view of an exemplary air beam.

As shown in FIG. 4, this angle change can be controlled using one or more axial reinforcements 1300 that can extend along free braid section 1150. Any or every axial reinforcement 1300 can be independently adjustable in length via one or more actuators 1600. This approach can result in any number of free braid sections 1150, and thus braided tube 1100 and/or air beam 1000, having the ability to dynamically bend in any direction, at any desired location. FIGS. 3, 4, 5, 8, and 9 illustrate exemplary embodiments of fixed length sections 1125, 1175. Fixed length axial reinforcements 3300 can be utilized to fix the shape of the air beam 1000 and/or provide strength to fixed length sections 1125, 1175.

Figure 5:
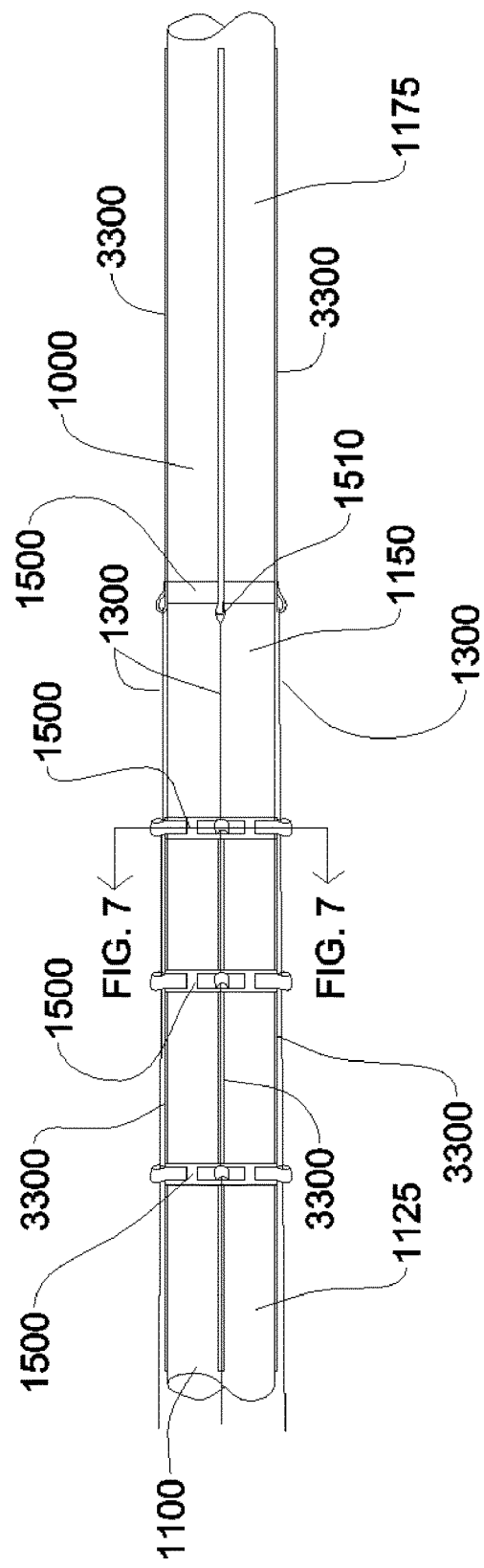
FIG. 5 shows a side view of an exemplary air beam.
Figure 12:
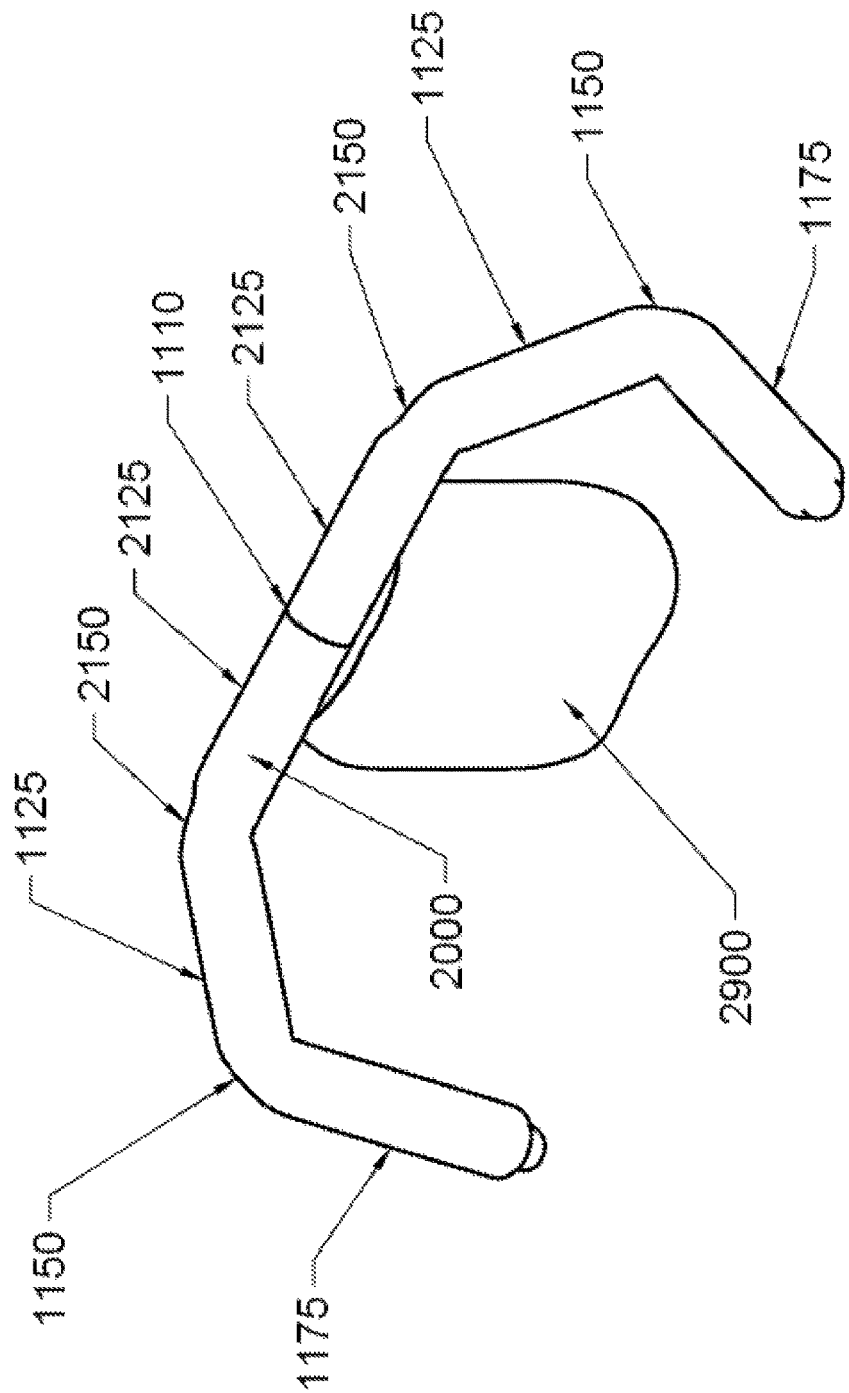
FIG. 12 shows an exemplary embodiment of multiple dynamic air beams integrated into an upper body, arms, and fingers of a humanoid robotic structure.

In FIG. 4, axial reinforcement 1300 can be adjusted through a connection 1610, which can be bonded, sewn, and/or attached to a loop, etc., on one end of axial reinforcement 1300 to an actuator 1600. In certain exemplary embodiments, actuator 1600 can comprise, e.g., a pneumatic muscle (which can be made by Festo of Hauppauge, N.Y.), a bellows (which can be obtained from Pneubotic of San Francisco, Calif., and which can be a series of parallel air chambers that when inflated lengthen in the perpendicular direction of the chamber and/or can apply a compressive force on the bellow on the opposite side of the joint), an electric motor, and/or an electric linear actuator. Actuator 1600 can be located in the fixed section 1125 of air beam 1000 adjacent to the free braid section 1150, as seen in FIG. 4. Connection 1610 can be very close to free braid section 1150 or it could be some distance and/or might utilize a router(s) 1500, such as one or more guides, fairleads, loops, and/or pulleys, etc., to direct it to actuator 1600. These routers can be custom designed. An exemplary router 1500, shown in FIG. 5 and FIG. 7, can comprise an approximately 1 inch wide webbing 1525 with four approximately 0.5 inch wide webbing loops 1550 spaced to match the axial position on the tube. This webbing assembly 1500 can be bonded around the perimeter of the tube 1100. If friction is an issue between the webbing and the axial reinforcements, router 1500 can utilize a fairlead, such as the Harkern Bullseye Fairlead, to replace and/or be incorporated into the webbing loops 1550. The other end 1510 of axial reinforcement 1300 can be connected to a fixed section 1175 or to an end (not shown) of air beam 1000 that can be adjacent to a free braid section 1150. Another possible configuration is shown in FIG. 5. In this exemplary embodiment, actuator 1600 (not shown) can be positioned in a remote location of an apparatus of which the air beam 1000 can be a part. An example of this, such as illustrated in FIG. 12, can be a humanoid robot with the actuators 1600 (not shown) and/or control system located in the chest cavity (2900) and/or control cables and/or cords 1300 (not shown) that can be routed, utilizing routers 1500 (not shown), to free braid sections 1150, 2150 in the airbeam(s) 2000. In this exemplary embodiment, airbeam 2000 can be a single continuous beam or multiple separate airbeams 2000 that are connected at the ends at location 1100.

Figure 6:
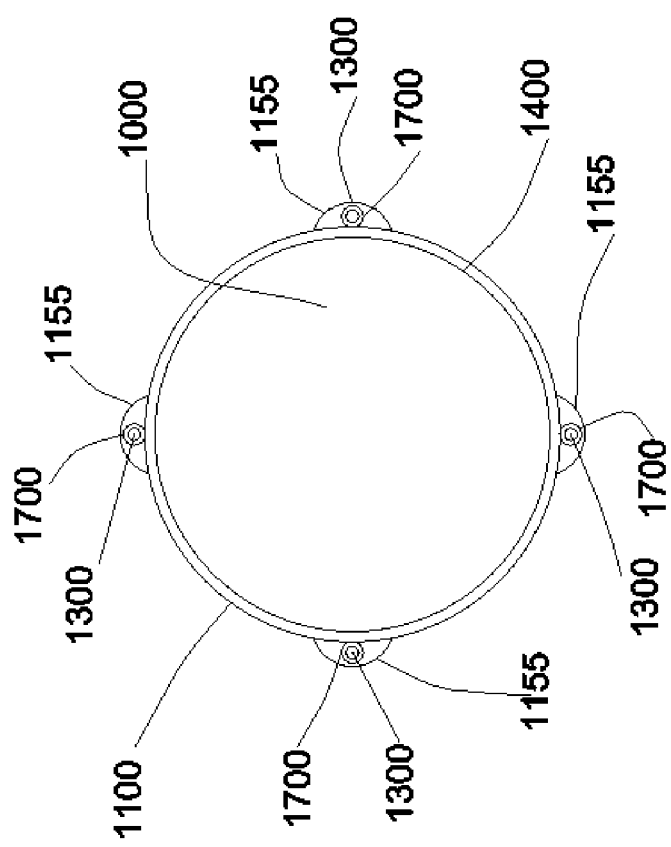
FIG. 6 shows a cross-sectional view taken at section 6-6 of FIG. 3.

In FIG. 2, that portion of each axial reinforcement 1301-1304 that is located in the free braid section can be braided into an axial position 1155 during the braiding process, and/or can be left free to translate through and/or between the braided fibers of braided tube 1100 to create movement of braided tube 1100 and/or the air beam. In FIG. 6, any number of axial reinforcements 1300 can be contained in a sleeve 1700, which can be supplied by A&P Technology of Cincinnati, Ohio and/or can allow for better translation through/along braided tube 1100, which can reduce friction, and/or can prevent the axial reinforcement 1300 being adhered to braided tube 1100 during a coating process. When utilized, the coating can promote abrasion resistance. The coating can be polymer, such as a silicon, urethane, or vinyl, etc. The coating can be put on as a liquid and allowed to cure. Sleeve 1700 can protect the braid body 1100, such as illustrated in FIG. 1, from damage due to the axial reinforcement 1300 moving between bias yarns 1200. This movement can occur when the braid angle is changing due to one or more axial reinforcements 1300 changing in length. One or more axial reinforcements 1300 can drag across one or more of bias yarns 1200 with the potential of causing abrasion to the bias yarns 1200 and/or vice versa.

Figure 7:
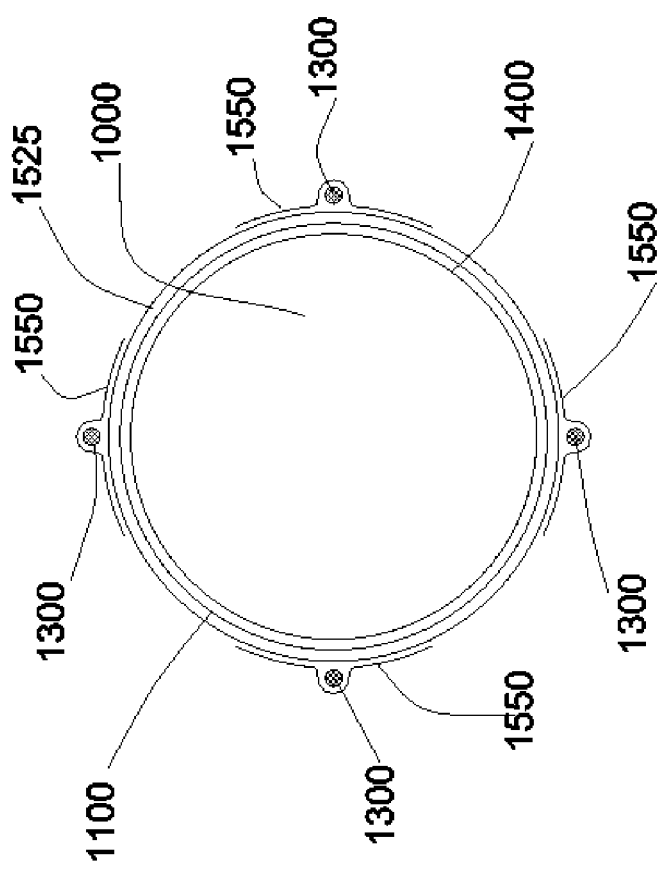
FIG. 7 shows a cross-sectional view taken at section 7-7 of FIG. 5.

In FIG. 7, any portion of any axial reinforcement 1300 that extends along free braid section can be attached externally to free braid section, potentially via one or more routers 1500 that can be configured to control the position of that axial reinforcement 1300. In certain exemplary embodiments, axial reinforcement 1300 can be replaced by actuator 2600, such as a pneumatic muscle, as shown in FIG. 8.

Figure 9:
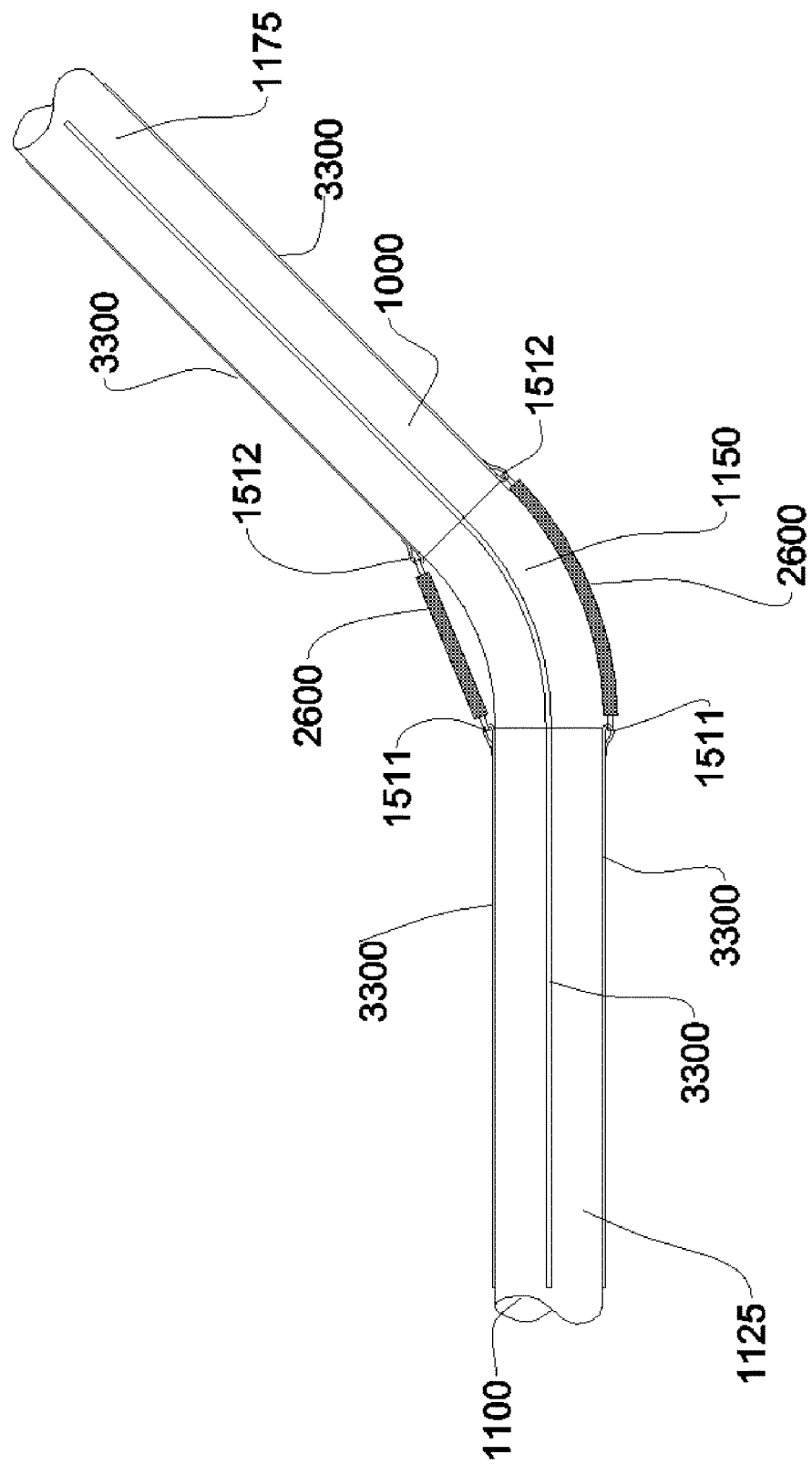
FIG. 9 shows an exemplary inflated air beam.

In FIG. 9, the change in angle of braided tube 1100 can be controlled using actuator 2600 over the length of free braid section 1150. This embodiment can utilize one or more actuators 2600 anchored at both ends 1511, 1512 of free braid section 1150. When actuator 2600 is a pneumatic muscle, the length change of free braid section 1150 can be controlled by pressure changes in that pneumatic muscle. In certain exemplary embodiments, a pneumatic muscle can utilize one or more routers 1500, as seen in FIG. 4, to control the position of muscle.

Certain exemplary embodiments can utilize any number of free braid sections 1150, such that their length can vary from providing approximately 0.5 inches of the overall length of air beam 1000, to creating the entire length of air beam 1000. Varying the number of free braid sections 1150 and/or the ratio of free braid sections 1150 to fixed braid sections 1125, 1175 can vary the types of bending produced in air beam 1000.

Figure 10:
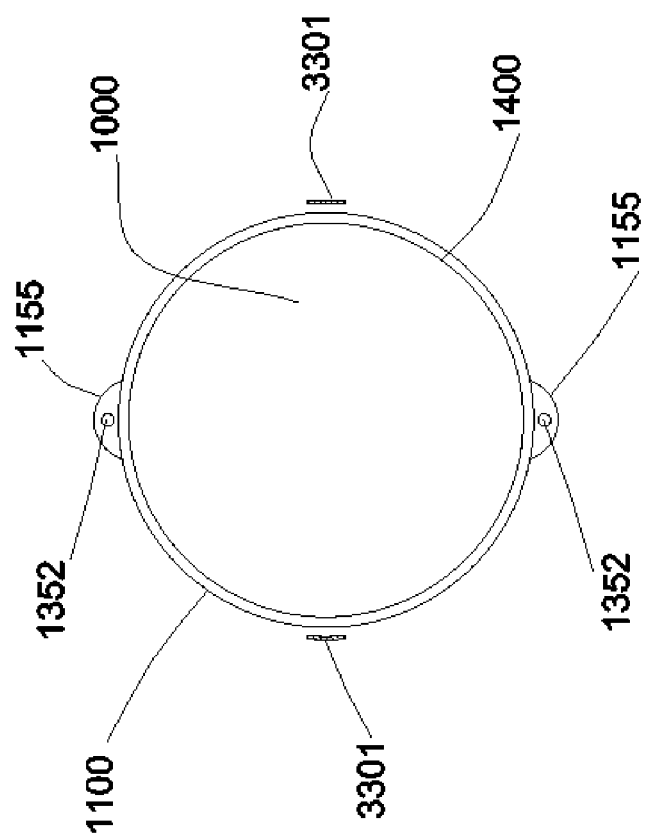
FIG. 10 shows a cross-sectional view taken at section 10-10 of FIG. 4.

In FIG. 2, FIG. 6, and FIG. 7, multiple axial reinforcements 1300 or 1301-1304 can be located at specific positions 1155 (which need not be evenly distributed) around the perimeter of the cylindrical free braid sections 1150, which can have a longitudinal cross-section having any closed shape, such as circular, elliptical, oblong, annular, polygonal, etc., any "corners" or wall intersections of that shape typically being somewhat rounded. Axial reinforcements 1300 can be any combination of adjustable or fixed lengths to create the desired degrees of freedom. FIG. 10 shows one example configuration with adjustable axial reinforcements 1352 and fixed axial reinforcements 3301 in the opposite plane, resulting in an air beam 1000 that can bend in only one plane. If all the axial reinforcements have an adjustable length, movement can be controlled over the full 360-degree range (with respect to the longitudinal axis of air beam 1000), and/or air beam 1000 can extend and/or shrink in overall length. In FIG. 2 presents an exemplary configuration that can exist in which axial reinforcements 1301 and 1302 are adjustable and axial reinforcements 1303 and 1304 are fixed. This can result in an air beam 1000 being able to bend in only one direction.

FIG. 6 shows the axial reinforcements 1300 that are adjustable and located ninety degrees apart around the perimeter of air beam 1000. The spacing of axial reinforcements 1300 does not have to be consistent around that perimeter. The angle between any neighboring pair of axial reinforcements can be adjusted and/or the circumferential position 1155 of an axial reinforcement 1300 can influence the bending strength of air beam 1000 and/or influence the dynamic force of air beam 1000.

The quantity of axial reinforcements 1300 can be customized to produce different behaviors, and/or to change the strength and/or stiffness in different planes for air beam 1000. There can be an axial reinforcement 1300 at only one position 1155 or there can be a number of axial reinforcements 1300 around the perimeter of any selected braided tube 1100. It would be typical to have between 2 and 12 axial reinforcements. These can be in clusters and/or evenly spaced around the perimeter.

Air beam 1000 and/or any free braid section 1150 can be pinched off completely to create a hinge point. The hinge can be controlled in the same manner as above, using any number of adjustable length axial reinforcements 1150 and/or actuators 2600. The stiffness of the hinge can be controlled by the degree to which the section is pinched off. The stiffness of the joint can be varied, without pinching off the tube, by changing the diameter of the tube. This can be done by changing the braid angle, but this can result in a reduction of range of motion. The stiffness of the joint can be varied by adjusting the tube diameter in the braiding process, which can allow the full range of braid angle change (approximately 50 degrees to 85 degree).

An exemplary embodiment of a dynamic structure can have an approximately 4-inch diameter and a working pressure of approximately 50 psig. In this exemplary embodiment, the free braid section 1150 at a braid angle of approximately 75 degrees can be approximately 6 inches long. The joint can have approximately 100 degrees of motion in any direction off the longitudinal centerline. The angle that the braid will approach hose angle (54.7 degrees) can be such that substantially all axial and hoop forces will be resisted in the braid body and/or the load on the axial reinforcements will approach zero. At this point motion in that direction will be limited. This range can be increased by decreasing the diameter or lengthening the free braid length at braid angle of approximately 75 degrees. This structure can handle a moment of approximately 81 foot-pounds before losing tension in any of the axial elements. As the structure begins to move, the decrease in braid angle can reduce the load on the axial elements, resulting in the strength of the joint changing through the range of motion. At approximately 55 degrees off the longitudinal centerline, the braid angle can be reduced to approximately 65 degrees and/or the strength of the joint can reduce to a moment of approximately 54 foot-pounds before an axial element loses tension. This allowable moment can be adjusted by changing pressure (typically a linear function) and/or diameter (typically a third power function). The last major variable can be the stiffness, which can be represented by EI (modulus of elasticity×area moment of inertia). Stiffness can be a function of the elasticity of the axial element and/or the diameter. In this example, if the axial elements were polyester webbing, the stiffness would be approximately 4,870 square foot-pounds. By changing the axial element to a Kevlar webbing, the stiffness would increase to approximately 12,170 square foot-pounds.

Figure 11:
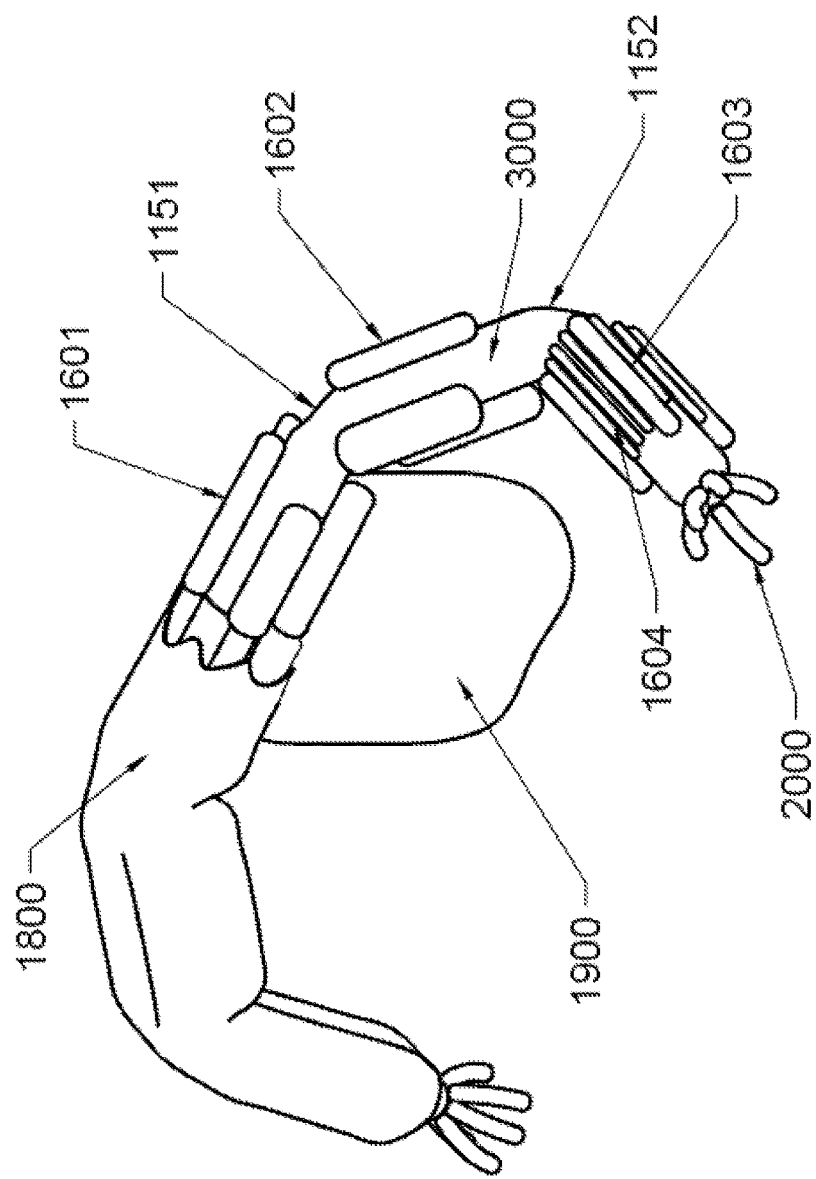
FIG. 11 shows an exemplary embodiment of multiple dynamic air beams integrated into an upper body, arms, and fingers of a humanoid robotic structure.

FIG. 11 is an illustration of an exemplary chest cavity 1900, exemplary shoulders joint 1151, exemplary elbow joint 1152, and exemplary fingers 2000 that are integrated into an exemplary humanoid robotic structure. This embodiment has the actuators 1601-1604 located in the adjacent fixed length braid sections to the free braid sections of the joints 1151-1152 they are controlling. The full length of the finger airbeams 2000 are a free braid section which results in curved motion down the full length, as described in paragraph [16]. There can be a fabric skin 1800 that covers the actuator to provide a finished look to the product. The airbeam 3000 is continuous from the right wrist to the left wrist. Note that as implied by FIG. 12, the actuators can be located elsewhere in, on, and/or adjacent the robotic structure, such as within chest cavity 2900.

Certain exemplary embodiments can provide an air beam configured to be dynamically moved, the air beam comprising:
 an inflatable gas bladder;
 a first braided tube substantially surrounding the gas bladder;
 a plurality of variable-length axial reinforcements that extend substantially parallel to a longitudinal axis of the first braided tube;
 a plurality of actuators, each actuator from the plurality of actuators coupled to a corresponding variable-length axial reinforcement and configured to operably shorten that variable-length axial reinforcement sufficiently to bend a first predetermined portion of the first braided tube in a first predetermined direction and to a first predetermined angle;

one or more fixed-length axial reinforcements that extend substantially parallel to the longitudinal axis of the first braided tube; and/or one or more routers configured to constrain movement of one or more of the variable-length axial reinforcements;

wherein:

the first braided tube is seamless;

the inflatable gas bladder is formed from a thermoplastic film;

the inflatable gas bladder is integral to the first braided tube;

the plurality of variable-length axial reinforcements are distributed about an external circumference of the first braided tube;

the plurality of variable-length axial reinforcements are unevenly distributed about an external circumference of the first braided tube;

the plurality of variable-length axial reinforcements extend along a section of the first braided tube, the section being shorter than the first braided tube;

at least one of the variable-length axial reinforcements is braided into the first braided tube;

at least one of the variable-length axial reinforcements is contained in a sleeve;

each of the plurality of variable-length axial reinforcements is independently adjustable in length;

one or more of the plurality of actuators is a pneumatic muscle;

one or more of the plurality of actuators is a motor;

one or more of the plurality of actuators is a bellows; and/or one or more of the plurality of actuators is a linear actuator.

Definitions

When the following phrases are used substantively herein, the accompanying definitions apply. These phrases and definitions are presented without prejudice, and, consistent with the application, the right to redefine these phrases via amendment during the prosecution of this application or any application claiming priority hereto is reserved. For the purpose of interpreting a claim of any patent that claims priority hereto, each definition in that patent functions as a clear and unambiguous disavowal of the subject matter outside of that definition.

a—at least one.
about—around and/or approximately.
above—at a higher level.
across—from one side to another.
activity—an action, act, step, and/or process or portion thereof.
actuator—a device that converts, translates, and/or interprets signals (e.g., electrical, optical, hydraulic, pneumatic, etc.) to cause a physical and/or humanly perceptible action and/or output, such as a motion (e.g., rotation of a motor shaft, vibration, position of a valve, position of a solenoid, position of a switch, and/or position of a relay, etc.), audible sound (e.g., horn, bell, and/or alarm, etc.), and/or visible rendering (e.g., indicator light, non-numerical display, and/or numerical display, etc).
adapt—to design, make, set up, arrange, shape, configure, and/or make suitable and/or fit for a specific purpose, function, use, and/or situation.
adapter—a device used to effect operative compatibility between different parts of one or more pieces of an apparatus or system.
adjustable—configured to change, match, and/or fit.
after—following in time and/or subsequent to.
air beam—an inflatable structure, having a length greatly exceeding its width or thickness.
along—through, on, beside, over, in line with, and/or parallel to the length and/or direction of; and/or from one end to the other of.
and—in conjunction with.
and/or—either in conjunction with or in alternative to.
angle—an inclination of one line and/or plane relative to another line and/or plane.
any—one, some, every, and/or all without specification.
apparatus—an appliance or device for a particular purpose.
approximately—about and/or nearly the same as.
are—to exist.
around—about, surrounding, and/or on substantially all sides of; and/or approximately.
as long as—if and/or since.
associate—to join, connect together, and/or relate.
at—in, on, and/or near.
at least—not less than, and possibly more than.
at least one—not less than one, and possibly more than one.
axial—located on, around, or in the direction of an axis.
axis—a straight line about which a body and/or geometric object rotates and/or can be conceived to rotate and/or a center line to which parts of a structure and/or body can be referred.
based on—indicating one or more factors that affect a determination, but not necessarily foreclosing additional factors that might affect that determination.
bellows—a flexible corrugated element used as an expansion joint, pump, and/or means of transmitting axial motion.
bend—(v) to cause to assume a curved or angular shape; (n) a curved and/or angled portion.
between—in a separating interval and/or intermediate to.
bladder—an inflatable bag, liner, and/or component.
braid—to interweave three or more strands, strips, or lengths in a diagonally overlapping pattern.
by—via and/or with the use and/or help of
can—is capable of, in at least some embodiments.
cause—to bring about, provoke, precipitate, produce, elicit, be the reason for, result in, and/or effect.
circuit—an electrically conductive pathway and/or a communications connection established across two or more switching devices comprised by a network and between corresponding end systems connected to, but not comprised by the network.
circumference—a boundary line of a substantially circular figure, area, and/or object.
composition of matter—a combination, reaction product, compound, mixture, formulation, material, and/or composite formed by a human and/or automation from two or more substances and/or elements.
comprising—including but not limited to.
configure—to design, arrange, set up, shape, and/or make suitable and/or fit for a specific purpose, function, use, and/or situation.

configured to—having a structure that, during operation, will perform the indicated activity(ies). To the extent relevant to the current application, the use of "configured to" is expressly not intended to invoke 35 U.S.C. § 112(f) for that structure.

connect—to join or fasten together.

constrain—to restrict, limit, regulate, and/or restrain within bounds.

contain—to hold or keep within limits; restrain.

containing—including but not limited to.

convert—to transform, adapt, and/or change.

corresponding—related, associated, accompanying, similar in purpose and/or position, conforming in every respect, and/or equivalent and/or agreeing in amount, quantity, magnitude, quality, and/or degree.

couple(d)—to join, connect, and/or link two things together.

coupleable—capable of being joined, connected, and/or linked together.

coupling—linking in some fashion.

create—to bring into being.

define—to establish the meaning, relationship, outline, form, and/or structure of; and/or to precisely and/or distinctly describe and/or specify.

derive—to receive, obtain, and/or produce from a source and/or origin.

determine—to find out, obtain, calculate, decide, deduce, ascertain, and/or come to a decision, typically by investigation, reasoning, and/or calculation.

device—a machine, manufacture, and/or collection thereof.

direction—a spatial relation between something and a course along which it points and/or moves; a distance independent relationship between two points in space that specifies the position of either with respect to the other; and/or a relationship by which the alignment and/or orientation of any position with respect to any other position is established.

distribute—to arrange, position, and/or spread.

dynamically—on demand, as necessary, and/or in an interactive manner wherein a current state is dependent on a past and/or future input and/or output.

each—every one of a group considered individually.

effective—sufficient to bring about, provoke, elicit, and/or cause.

embodiment—an implementation, manifestation, and/or concrete representation.

estimate—(n) a calculated value approximating an actual value; (v) to calculate and/or determine approximately and/or tentatively.

exemplary—serving as an example, instance, and/or illustration.

extend—to reach spatially outward, stretch, cover, and/or span.

external—exterior and/or relating to, existing on, and/or connected with the outside and/or or an outer part.

film—a thin, flexible, and/or transparent skin, membrane, covering, coating, and/or sheet.

first—a label for a referenced element in one or more patent claims, but that label does not necessarily imply any type of ordering to how that element (or any other elements of a similar type) is implemented in embodiments of the claimed subject matter.

fixed—firmly in position, stationary, determined, established, set, unchanging, and/or not subject to change and/or variation.

for—with a purpose of formed—constructed.

from—used to indicate a source, origin, and/or location thereof.

further—in addition.

gas—a substance in a gaseous state, that is, in a state of matter distinguished from the solid and liquid states by relatively low density and viscosity, relatively great expansion and contraction with changes in pressure and temperature, the ability to diffuse readily, and the spontaneous tendency to become distributed uniformly throughout any container.

generate—to create, produce, give rise to, and/or bring into existence.

given— having—including but not limited to.

including—including but not limited to.

independently—without the aid of, use of, and/or reliance upon another.

inflate—to fill (something) with air and/or gas so as to make it swell.

initialize—to prepare something for use and/or some future event.

install—to connect or set in position and prepare for use.

integral—formed or united into another entity.

into—toward, in the direction of, and/or to the inside of.

is—to exist in actuality.

length—a longest dimension of something and/or the measurement of the extent of something along its greatest dimension.

linear—in, of, describing, described by, or related to a straight line.

longitudinal—of and/or relating to a length; placed and/or running lengthwise.

longitudinal axis—a straight line defined parallel to an object's length and passing through a centroid of the object.

may—is allowed and/or permitted to, in at least some embodiments.

method—one or more acts that are performed upon subject matter to be transformed to a different state or thing and/or are tied to a particular apparatus, said one or more acts not a fundamental principal and not pre-empting all uses of a fundamental principal.

more—a quantifier meaning greater in size, amount, extent, and/or degree.

motor—a device that transforms electrical, hydraulic, and/or pneumatic energy into mechanical energy that produces or imparts linear and/or angular motion.

move—to change a position and/or place.

movement—an act and/or instance of moving, and/or a change in position from one location to another.

muscle—a mechanism capable of contracting and/or relaxing to effect movement of a structural member to which it is attached.

near—a distance of less than approximately [X].

no—an absence of and/or lacking any.

one—being and/or amounting to a single unit, individual, and/or entire thing, item, and/or object.

operable—practicable and/or fit, ready, and/or configured to be put into its intended use and/or service.

operative—when in operation for its intended use and/or service.

or—a conjunction used to indicate alternatives, typically appearing only before the last item in a group of alternative items.

outside—beyond a range, boundary, and/or limit; and/or not within.

parallel—of, relating to, and/or designating lines, curves, planes, and/or surfaces everywhere equidistant.
per—for each and/or by means of.
plurality—the state of being plural and/or more than one.
pneumatic—of or relating to air or other gases.
portion—a part, component, section, percentage, ratio, and/or quantity that is less than a larger whole.
pre-—a prefix that precedes an activity that has occurred beforehand and/or in advance.
predetermine—to determine, decide, and/or establish in advance.
prevent—to hinder, avert, and/or keep from occurring.
prior—before and/or preceding in time or order.
probability—a quantitative representation of a likelihood of an occurrence.
product—something produced by human and/or mechanical effort.
project—to calculate, estimate, or predict.
provide—to furnish, supply, give, and/or make available.
range—a measure of an extent of a set of values and/or an amount and/or extent of variation.
ratio—a relationship between two quantities expressed as a quotient of one divided by the other.
receive—to get as a signal, take, acquire, and/or obtain.
recommend—to suggest, praise, commend, and/or endorse.
reduce—to make and/or become lesser and/or smaller.
reinforcement—something that reinforces and/or strengthens.
remove—to eliminate, remove, and/or delete, and/or to move from a place or position occupied.
repeat—to do again and/or perform again.
repeatedly—again and again; repetitively.
request—to express a desire for and/or ask for.
result—(n.) an outcome and/or consequence of a particular action, operation, and/or course; (v.) to cause an outcome and/or consequence of a particular action, operation, and/or course.
router—a device configured to direct and/or constrain movement.
said—when used in a system or device claim, an article indicating a subsequent claim term that has been previously introduced.
seamless—not having or joined by a seam or seams.
second—a label for an element in one or more patent claims, the element other than a "first" referenced element of a similar type, but the label does not necessarily imply any type of ordering to how that "second" element or the "first" element is implemented in embodiments of the claimed subject matter.
section—a defined part of an object.
select—to make a choice or selection from alternatives.
set—a related plurality.
shorten—to make short or shorter.
sleeve—an annular member and/or part.
species—a class of individuals and/or objects grouped by virtue of their common attributes and assigned a common name; a division subordinate to a genus.
store—to place, hold, and/or retain data, typically in a memory.
substantially—to a great extent and/or degree.
sufficiently—to a degree necessary to achieve a predetermined result.
support—to bear the weight of, especially from below.
surrounding—to encircle, enclose, and/or confine on all sides, and/or extend on all sides of simultaneously.
system—a collection of mechanisms, devices, machines, articles of manufacture, processes, data, and/or instructions, the collection designed to perform one or more specific functions.
that—a pronoun used to indicate a thing as indicated, mentioned before, present, and/or well known.
thermoplastic—a polymeric substance that can be softened by heat and hardened by cooling in a reversible physical process such as, for example, GE Noryl SE1-X (available from GE Plastics, of Pittsfield, Ma.) and/or Asahi Xyron 540V (available from Asahi Kasei America Inc., of New York, N.Y.), etc.
through—across, among, between, and/or in one side and out the opposite and/or another side of
to—a preposition adapted for use for expressing purpose.
transform—to change in measurable: form, appearance, nature, and/or character.
transmit—to send as a signal, provide, furnish, and/or supply.
treatment—an act, manner, or method of handling and/or dealing with someone and/or something.
tube—an elongate member having a longitudinal axis and defining a longitudinal cross-section resembling any substantially closed shape such as, for example, a circle, a non-circle such as an oval (which generally can include a shape that is substantially in the form of an obround, ellipse, limaçon, cardioid, cartesian oval, and/or Cassini oval, etc), and/or a polygon such as a triangle, rectangle, square, parallelogram, rhomboid, pentagon, hexagon, the shape of the letter "D", the shape of the letter "P", etc. Thus, a right circular cylinder is one form of a tube, an elliptic cylinder is another form of a tube having an elliptical longitudinal cross-section, and a generalized cylinder is yet another form of a tube.
unevenly—not consistent and/or not uniform.
upon—immediately or very soon after; and/or on the occasion of.
use—to put into service.
variable—changeable, subject to change and/or variation, and/or likely to change and/or vary.
via—by way of and/or utilizing.
weight—a force with which a body is attracted to Earth or another celestial body, equal to the product of the object's mass and the acceleration of gravity; and/or a factor and/or value assigned to a number in a computation, such as in determining an average, to make the number's effect on the computation reflect its importance, significance, preference, impact, etc.
when—at a time and/or during the time at which.
wherein—in regard to which; and; and/or in addition to.
with—accompanied by.
with regard to—about, regarding, relative to, and/or in relation to.
with respect to—about, regarding, relative to, and/or in relation to.
within—inside the limits of.
zone—a region and/or volume having at least one predetermined boundary.

Note

Various substantially and specifically practical and useful exemplary embodiments of the claimed subject matter are described herein, textually and/or graphically, including the best mode, if any, known to the inventor(s), for implementing the claimed subject matter by persons having ordinary skill in the art. References herein to "in one embodiment", "in an embodiment", or the like do not necessarily refer to the same embodiment.

Any of numerous possible variations (e.g., modifications, augmentations, embellishments, refinements, and/or enhancements, etc.), details (e.g., species, aspects, nuances, and/or elaborations, etc.), and/or equivalents (e.g., substitutions, replacements, combinations, and/or alternatives, etc.) of one or more embodiments described herein might become apparent upon reading this document to a person having ordinary skill in the art, relying upon his/her expertise and/or knowledge of the entirety of the art and without exercising undue experimentation. The inventor(s) expects any person having ordinary skill in the art, after obtaining authorization from the inventor(s), to implement such variations, details, and/or equivalents as appropriate, and the inventor(s) therefore intends for the claimed subject matter to be practiced other than as specifically described herein. Accordingly, as permitted by law, the claimed subject matter includes and covers all variations, details, and equivalents of that claimed subject matter. Moreover, as permitted by law, every combination of the herein described characteristics, functions, activities, substances, and/or structural elements, and all possible variations, details, and equivalents thereof, is encompassed by the claimed subject matter unless otherwise clearly indicated herein, clearly and specifically disclaimed, or otherwise clearly unsuitable, inoperable, or contradicted by context.

The use of any and all examples, or exemplary language (e.g., "such as") provided herein, is intended merely to better illuminate one or more embodiments and does not pose a limitation on the scope of any claimed subject matter unless otherwise stated. No language herein should be construed as indicating any non-claimed subject matter as essential to the practice of the claimed subject matter.

Thus, regardless of the content of any portion (e.g., title, field, background, summary, description, abstract, drawing figure, etc.) of this document, unless clearly specified to the contrary, such as via explicit definition, assertion, or argument, or clearly contradicted by context, with respect to any claim, whether of this document and/or any claim of any document claiming priority hereto, and whether originally presented or otherwise:
there is no requirement for the inclusion of any particular described characteristic, function, activity, substance, or structural element, for any particular sequence of activities, for any particular combination of substances, or for any particular interrelationship of elements;
no described characteristic, function, activity, substance, or structural element is "essential"; and
within, among, and between any described embodiments:
any two or more described substances can be mixed, combined, reacted, separated, and/or segregated;
any described characteristic, function, activity, substance, component, and/or structural element, or any combination thereof, can be specifically included, duplicated, excluded, combined, reordered, reconfigured, integrated, and/or segregated;
any described interrelationship, sequence, and/or dependence between any described characteristics, functions, activities, substances, components, and/or structural elements can be omitted, changed, varied, and/or reordered;
any described activity can be performed manually, semi-automatically, and/or automatically;
any described activity can be repeated, performed by multiple entities, and/or performed in multiple jurisdictions.

The use of the terms "a", "an", "said", "the", and/or similar referents in the context of describing various embodiments (especially in the context of the following claims) are to be construed to cover both the singular and the plural, unless otherwise indicated herein or clearly contradicted by context.

The terms "comprising," "having," "including," and "containing" are to be construed as open-ended terms (i.e., meaning "including, but not limited to,") unless otherwise noted.

When any number or range is described herein, unless clearly stated otherwise, that number or range is approximate. Recitation of ranges of values herein are merely intended to serve as a shorthand method of referring individually to each separate value falling within the range, unless otherwise indicated herein, and each separate value and each separate sub-range defined by such separate values is incorporated into the specification as if it were individually recited herein. For example, if a range of 1 to 10 is described, that range includes all values therebetween, such as for example, 1.1, 2.5, 3.335, 5, 6.179, 8.9999, etc., and includes all sub-ranges therebetween, such as for example, 1 to 3.65, 2.8 to 8.14, 1.93 to 9, etc., even if those specific values or specific sub-ranges are not explicitly stated.

When any phrase (i.e., one or more words) appearing in a claim is followed by a drawing element number, that drawing element number is exemplary and non-limiting on claim scope.

No claim or claim element of this document is intended to invoke 35 USC 112(f) unless the precise phrase "means for" is followed by a gerund.

Any information in any material (e.g., a United States patent, United States patent application, book, article, web page, etc.) that has been incorporated by reference herein, is incorporated by reference herein in its entirety to its fullest enabling extent permitted by law yet only to the extent that no conflict exists between such information and the other definitions, statements, and/or drawings set forth herein. In the event of such conflict, including a conflict that would render invalid any claim herein or seeking priority hereto, then any such conflicting information in such material is specifically not incorporated by reference herein. Any specific information in any portion of any material that has been incorporated by reference herein that identifies, criticizes, or compares to any prior art is not incorporated by reference herein.

Applicant intends that each claim presented herein and at any point during the prosecution of this application, and in any application that claims priority hereto, defines a distinct patentable invention and that the scope of that invention must change commensurately if and as the scope of that claim changes during its prosecution. Thus, within this document, and during prosecution of any patent application related hereto, any reference to any claimed subject matter is intended to reference the precise language of the then-pending claimed subject matter at that particular point in time only.

Accordingly, every portion (e.g., title, field, background, summary, description, abstract, drawing figure, etc.) of this document, other than the claims themselves and any provided definitions of the phrases used therein, is to be regarded as illustrative in nature, and not as restrictive. The scope of subject matter protected by any claim of any patent that issues based on this document is defined and limited only by the precise language of that claim (and all legal equivalents thereof) and any provided definition of any phrase used in that claim, as informed by the context of this document when reasonably interpreted by a person having ordinary skill in the relevant art.

What is claimed is:

1. An air beam configured to be dynamically moved, the air beam comprising:
   an inflatable gas bladder;
   a first braided tube substantially surrounding the gas bladder;
   a plurality of variable-length axial reinforcements that extend substantially parallel to a longitudinal axis of the first braided tube, wherein for each variable-length axial reinforcement from the plurality of variable-length axial reinforcements, a portion of the variable-length axial reinforcement that extends along a free braid section of the first braided tube is configured to be adjustable in length independently of any other variable-length axial reinforcement from the plurality of variable-length axial reinforcements;
   a plurality of actuators, each actuator from the plurality of actuators coupled to a corresponding variable-length axial reinforcement from the plurality of variable-length axial reinforcements and configured to operably shorten the portion of the corresponding variable-length axial reinforcement that extends along the free braid section sufficiently to bend a first predetermined portion of the first braided tube in a first predetermined direction and to a first predetermined angle
   wherein at least one of the plurality of variable-length axial reinforcements is braided into the first braided tube.

2. The air beam of claim 1, wherein:
   the first braided tube is seamless.

3. The air beam of claim 1, wherein:
   the inflatable gas bladder is formed from a thermoplastic film.

4. The air beam of claim 1, wherein:
   the inflatable gas bladder is integral to the first braided tube.

5. The air beam of claim 1, wherein:
   the plurality of variable-length axial reinforcements are distributed about an external circumference of the first braided tube.

6. The air beam of claim 1, wherein:
   the plurality of variable-length axial reinforcements are unevenly distributed about an external circumference of the first braided tube.

7. The air beam of claim 1, wherein:
   the plurality of variable-length axial reinforcements extend along a section of the first braided tube, the section being shorter than the first braided tube.

8. The air beam of claim 1, wherein:
   at least one of the plurality of variable-length axial reinforcements is contained in a sleeve.

9. The air beam of claim 1, wherein:
   one or more of the plurality of actuators is a pneumatic muscle.

10. The air beam of claim 1, wherein:
    one or more of the plurality of actuators is a motor.

11. The air beam of claim 1, wherein:
    one or more of the plurality of actuators is a bellows.

12. The air beam of claim 1, wherein:
    one or more of the plurality of actuators is a linear actuator.

13. The air beam of claim 1, further comprising:
    one or more fixed-length axial reinforcements that extend substantially parallel to the longitudinal axis of the first braided tube.

14. The air beam of claim 1, further comprising:
    one or more routers configured to constrain movement of one or more of the plurality of variable-length axial reinforcements.

* * * * *